Sept. 19, 1944.    K. B. STUART    2,358,359
ACTIVE CARBON PRODUCTION
Filed May 17, 1939
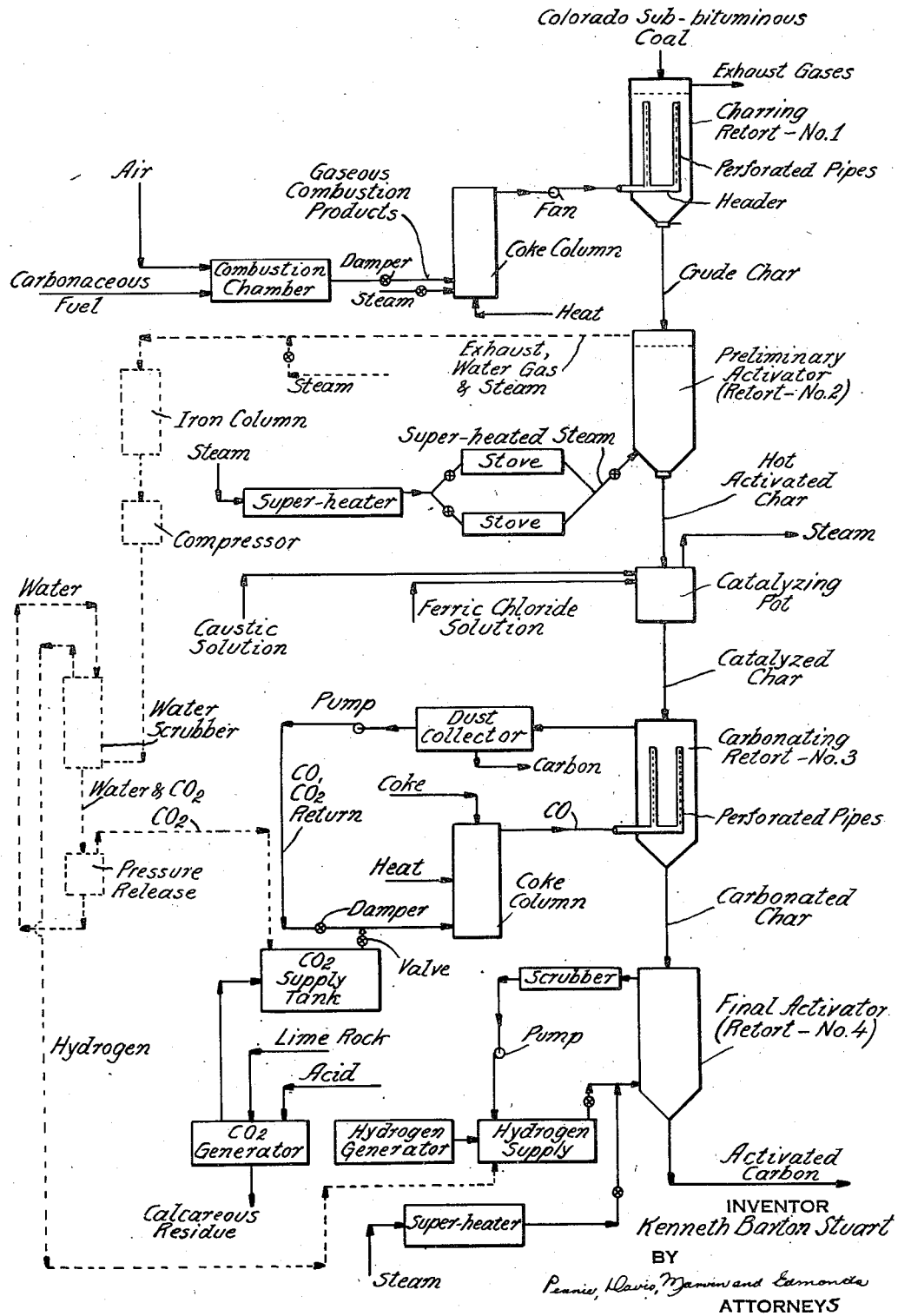
INVENTOR
Kenneth Barton Stuart
BY
Pennie, Davis, Marvin and Edmonds
ATTORNEYS Patented Sept. 19, 1944

2,358,359

UNITED STATES PATENT OFFICE 2,358,359

ACTIVE CARBON PRODUCTION

Kenneth Barton Stuart, Denver, Colo., assignor to The Colorado Fuel and Iron Corporation, a corporation of Colorado Application May 17, 1939, Serial No. 274,124

9 Claims. (Cl. 252—289)

This invention relates to active carbon production and aims to provide improvements in processes and apparatus for its manufacture. The invention is concerned particularly with processes in which yield of activated and activatable carbon is increased by the dissociation of carbon monoxide to cause deposition of additional carbon in a char derived from sub-bituminous coal or the like, but has more general application and offers advantages when applied to a variety of source materials and methods for active carbon production.

In heretofore customary processes of active carbon production carbonaceous raw material of organic origin such as wood, nut-shells, coal and the like has been subjected to destructive distillation to drive off volatile constituents and form a char, which is activated by contact with suitable hot gases, such as superheated steam.

In my copending application Serial No. 138,086, filed April 21, 1937, now Patent No. 2,162,763, dated June 20, 1939, I have disclosed a process in which the yield of activated carbon from a char is increased by passing hot carbon monoxide in contact therewith under such conditions that it dissociates into carbon dioxide and elemental carbon which tends to be retained in the char, either as active carbon or as carbon that may be activated by subsequent treatment, the yield of active carbon by this process being still further increased if volatile products, such as hydrocarbons, carbohydrates, and other gaseous carbonaceous compounds driven off during charring are not subjected to cracking in contact with the char.

Cracking of such volatile products yields carbon that is neither active nor activatable and which, moreover, tends to plug pores and mask carbon in the char which otherwise might be active, but this undesirable cracking may be avoided by heating the material undergoing charring in such manner that the expelled volatile products do not come into contact with surfaces that are substantially hotter than they are. Heating of the material by direct contact with hot gas introduced at a plurality of points so as to prevent the establishment of a substantial rising thermal gradient along the direction of gas passage avoids cracking.

As the result of my investigations, I have discovered other factors which influence the yield of activated carbon. Thus, I have discovered that the yield of activated carbon from some types of source material (such for example as woods, peats and lignites, which are characteristic of those carbonaceous materials containing in excess of 20 per cent oxygen on an ash and moisture free basis, and semi-bituminous, semi-anthracite and anthracite coal, which are characteristic of those carbonaceous materials having an oxygen content below 5 per cent on an ash and moisture free basis) that tend upon charring to give off relatively small proportions of volatile products which at room temperature are tarry liquids, is increased if dissociating carbon monoxide is brought into contact with the material during its charring.

On the other hand, the yield of active carbon from other types of source material (such for example as sub-bituminous and bituminous coals, which may be said to be characteristic of carbonaceous materials containing between 5 per cent and 20 per cent oxygen on an ash and moisture free basis) that tend upon charring to give off relatively large proportions of volatile products that at room temperature are tarry liquids is not increased by contact with dissociating CO during charring. In other words, a relatively large proportion of volatile products that are tarry liquids at room temperature (say, in excess of 6 gallons of tar per ton of material charred in the Bureau of Mines-American Gas Association 13 inch test retort) interferes with the deposition of additional carbon through the dissociation of carbon monoxide, or else the carbon resulting from such treatment is inactive and does not become active when treated with superheated steam, probably because the carbon adsorbs the tarry hydrocarbons so tenaciously that a treatment which is sufficiently severe to drive off the adsorbed hydrocarbons is more than sufficient to drive off the carbon itself.

I have discovered, however, that in the case of source material that is not benefited by contact with dissociating CO during charring, contact of the material with steam at this stage of the operation is beneficial in that (1) Steam tends to inhibit cracking of hydrocarbons driven off during charring and thus reduces the amount of unactivatable carbon initially formed in the charge; and (2) Steam tends to bring about hydration of hydrocarbons evolved during charring. These hydrated hydrocarbons are adsorbed less readily and less tenaciously by the active carbon of the char, so that restoration of its activity by subsequent treatment is facilitated.

Further, I have discovered that the presence of hydrogen in contact with source material being charred tends to be beneficial in that resulting hydration and hydrogenation render evolved hydrocarbons less adsorbable by the carbon present and thus reduce the burden upon subsequent activation steps.

Hydrogen may be formed by reaction of steam with carbon monoxide according to the reaction $$H_2O + CO = H_2 + CO_2$$

and the hydrogen thus formed exerts a beneficial influence during charring. However, steam should not be employed in admixture with CO in gaseous heating media employed to char source material which is of such a nature that dissociation of CO during charring results in an increase in yield of active or activatable carbon, for in such case the beneficial effect of the CO is greater than that of the hydrogen resulting from its destruction. Moreover, the carbon dioxide which is the other end product of the reaction acts as a diluent, and so reduces the rate and extent of reaction between hydrogen and the substances to be hydrated or hydrogenized.

It will now be apparent that the constituents of a hot gaseous medium passed into or through source material to bring about charring thereof should be varied in accordance with the nature of the material, i. e., whether it is benefited more by the presence of carbon monoxide or by the presence of steam. In accordance with my invention, the desired control of the constituents of the heating medium may be obtained by passing hot gaseous products of combustion from a furnace supplied with carbonaceous fuel and air through an incandescent column of coke or the like and by varying the proportions of water vapor in the gas passing through the coke column and the time or temperature or both of the contact between the gas and the coke. When the material undergoing charring gives off relatively small proportions of volatile products that are tarry liquids at atmospheric temperatures, the carbon monoxide content of the gaseous heating medium should be as high as possible, water vapor should be omitted from the products of combustion passed to the coke column and the time and temperature of contact should be such as to permit a thorough reaction between coke and carbon dioxide to form carbon monoxide. When the material undergoing charring gives off a relatively high proportion of volatile products that are tarry liquids at room temperature, the presence of hydrogen and steam (in preference to carbon monoxide) should be furthered by adding water vapor to the products of combustion and reducing the time of contact of the products of combustion with the coke. The water vapor employed in such circumstances should be in excess of that required for reaction with any CO present, and combustion should be regulated to produce a maximum of $CO_2$ without, however, permitting any free oxygen to come into contact with the material being charred. In this connection, it may be pointed out that the reaction $H_2O + CO = H_2 + CO_2$ is reversible, but does not proceed to the right to completion in the absence of a catalyst.

After the char has been formed, it is advantageous to subject it to preliminary activation with superheated steam or other hot gas to drive off adsorbed material and assure optimum conditions for treatment of the char with dissociating CO to increase the yield of activated carbon. In some instances, however, the char as formed is sufficiently clean to be treated immediately with CO.

It is characteristic of many and perhaps most carbonaceous materials suitable for the production of active carbon that only a small quantity of volatile products consisting mostly of gases are evolved when heated to a temperature of 300° C. Between the temperatures 300° to 550 C. the majority of the volatile products, and practically all of those that are tarry liquids at room temperature, are evolved.

In view of these facts the benefits of heating some materials in contact with hot carbonaceous gases to a temperature of 300 C., followed by carbonizing in contact with gases containing a large proportion of water vapor between the temperatures 300° and 500° C., and subsequently treating with gases, consisting largely of carbon monoxide, water vapor and hydrogen, during carbonization to 750° C., are at once evident because the water vapor will inhibit cracking at the temperature zone at which the tarry liquids are being evolved, while the carbon monoxide will tend to dissociate and the hydrogen and water vapor will tend to hydrogenate and hydrate the adsorbed compounds at carbonization temperatures above those at which tarry liquids are evolved.

Active carbon itself tends to catalyze the dissociation of CO into carbon and carbon dioxide, this dissociation proceeding with some chars without an extraneous catalyst at temperatures above about 350° C. However, an extraneous catalyst is usually desirable for its effect in accelerating the dissociation and increasing the degree thereof. Optimum temperatures for various types of catalysts are as follows:

| | Degrees centigrade |
|---|---|
| Iron and its compounds | 350 to 550 |
| Cobalt and its compounds | ±650 |
| Nickel and its compounds | 450 to 750 |
| Manganese and its compounds | ±850 |
| Chromium and its compounds | ±650 |
| Aluminum and its compounds | ±550 |

Iron and its salts are preferred both from the standpoints of cost and activity. Thus, I have found that it is advantageous to spray the char with a solution of ferric chloride or other soluble iron salt and subsequently by addition of an alkali solution to bring about the deposition of finely divided iron hydroxide or iron oxide (depending upon the temperature) within the char. The deposit thus formed should contain from 1 to 3% by weight of Fe, on the weight of the char, for optimum results.

The carbon monoxide employed should be as concentrated as possible, and in accordance with my invention a suitable concentrated supply is obtained by passing concentrated carbon dioxide (obtained for example by reaction of acid and limestone) through a coke column or the like maintained at a temperature suitable for the reduction of the carbon dioxide to CO. The carbon monoxide thus formed is passed through the catalyzed char and dissociates therein. Carbon resulting from the dissociation is deposited within the char and the remaining $CO_2$ is returned to the coke column for further reaction. In this manner the initial supply of carbon dioxide is restored, so that the carbon deposited in the char may be derived, if desired, almost entirely from the coke column.

The reaction, $2CO \rightleftarrows C + CO_2$, occurs with a decrease in volume and is forced to the right by pressure. Hence, it is desirable to supply the CO to the char at pressures in excess of atmospheric, and I prefer to introduce the CO to the char at 10 to 20 pounds per square inch gauge pressure.

I have found that sulphur tends to poison catalysts employed to further dissociation of CO. Hence, for optimum results, the char should be maintained sulphur free by removing sulphur from the gaseous medium employed to form the char, by preliminary activation with steam, and by using sulphur-free coke in the carbon monoxide producer.

In short, the step in which carbon is derived by dissociation of CO and deposited within the char (hereinafter called the carbonating step) should be conducted out of contact with strongly adsorbed substances such as normally liquid hydrocarbons or catalyst poisons such as sulphur, is best conducted separately from charring with most raw materials (and especially those which yield much normally liquid tarry products upon charring), should be conducted with as high a concentration of CO as possible and with CO in amount in excess of that required for reaction with any hydrogen or water vapor present or evolved and should be carried on at an elevated pressure and in the absence of steam because of the latter's tendency to react with CO.

Following carbonating treatment the carbon initially formed in the char and that resulting from breakdown of CO is activated. I have found that ordinary activation with superheated steam alone is undesirable because it tends to destroy excessive amounts of the carbon, probably because that resulting from CO dissociation is unusually reactive and sensitive. In fact, prolonged activation treatment with straight superheated steam may undo all the good resulting from carbonation. However, I have found that excessive consumption of carbon during activation may be avoided by including a substantial proportion of hydrogen in the activating gas. The hydrogen, or other gas which is adsorbed by the carbon more strongly (i. e., preferentially to the steam) thus operates to prevent carbon consumption by the latter. Moreover, hydrogen, by promoting hydrogenation or hydration of substances adsorbed by the carbon, renders these less adsorbable and aids in their expulsion. Nevertheless, the proportion of hydrogen employed should not exceed that needed to prevent the consumption of carbon by the steam, because an excess reduces the rate at which adsorbed substances are removed. In practice I have found that about one volume of hydrogen to one or two volumes of steam is effective for activating the carbon and inhibiting its destruction.

The proportions of hydrogen and steam to employ in activation will, however, depend upon the temperature and pressure at which activation is carried out. Thus, when activation is carried out under a pressure of 60 lbs. per sq. in. in excess of atmospheric, a mixture of about 97 parts of hydrogen with only 3 parts of water vapor may be employed advantageously.

My invention will be more thoroughly understood in the light of the following detailed description of a presently preferred practice of my invention, taken in conjunction with the accompanying single figure which is a flow sheet of the process of my invention adapted to the production of active carbon from a Colorado sub-bituminous coal.

Charring

Referring now to the figure, the source material, in this case a Colorado sub-bituminous coal [(which upon distillation yields about 35 to 40% (dry basis) of volatile matter of which about 7 gallons (when carbonized to 700° C. in the Bureau of Mines-American Gas Association 13 inch test retort) is a tarry liquid at room temperature)] is charged in batches into a charring retort (No. 1) and there subjected to destructive distillation by direct contact with hot gases. These gases are derived by the combustion of coal or natural gas or other such fuel in air in a combustion chamber and by passing the hot gaseous products of combustion through a column packed with pieces of porous incandescent coke of about 2 x 1 inch size and heated to incandescence. Steam in regulated quantities may also be introduced into the coke column through a valved line, and the rate of flow of the products of combustion to the coke column may be regulated by means of a damper. Flow of gas through the coke column is induced by means of a fan disposed between it and the No. 1 retort. The gas passes into the batch in the retort through a header and a plurality of upright perforated pipes, an effort being made to raise the temperature of all portions of the bath at the same rate and to avoid the presence of rising thermal gradients along the direction of gas passage thereby preventing contact of evolved hydrocarbons with surfaces hotter than they are. Thus cracking and deposition of undesirable graphitic carbon is inhibited.

The exhaust gases from the No. 1 retort contain volatile products evolved from the coal. If it is economically feasible these exhaust gases may be treated to recover the tar, ammonia, light oils, etc. Otherwise these, together with other combustible constituents in the gas, may be burned and the heat usefully employed in this or neighboring processes.

The coal charged to the retort is preferably about ½ to ¼ inch in size, and it is heated to a temperature of 650° C. to 750° C. by means of the hot gases derived as described hereinbefore. The incandescent coke prevents any oxygen from entering the retort, so that distillation proceeds therein without substantial burning. The analysis of the gas passed through the batch in the charring retort may vary within wide limits, depending upon whether the batch is such as to be benefited by the presence of CO. Thus, when natural gas is used as a fuel the gas to the retort may vary from a mixture of one volume of carbon dioxide, two volumes of water vapor and eight volumes of nitrogen to a mixture consisting of four volumes of carbon monoxide, two volumes of hydrogen and eight volumes of nitrogen, depending upon the time of contact between the gases and the incandescent coke. Other mixtures may be obtained by proper selection of fuel.

In the case of the Colorado sub-bituminous coal under consideration, a substantial proportion of water vapor in the gases supplied to the No. 1 retort is desirable. Hence the gases are passed through the coke at a velocity that is high enough to avoid substantial conversion of the water vapor present to carbon monoxide and hydrogen, and the gases supplied to the retort have approximately the following analysis:

| | Per cent |
|---|---|
| Water vapor | 15 |
| Hydrogen | 4 |
| Carbon monoxide | 7 |
| Carbon dioxide | 6 |
| Nitrogen | 68 |

However, as explained hereinbefore, certain classes of carbonaceous source materials are benefited by contact with dissociating CO during charring, and in such cases, the contact between the gas and the incandescent coke should be prolonged to give the maximum practicable CO content, and a catalyst to promote dissociation of CO should be added to such materials before they are charred.

In the case considered here, the gases enter the No. 1 retort at a temperature of 900° C. to 1000° C. and leave at a temperature of 400° C. to 750° C. The sensible heat in these gases is such that 110,000 cu. ft. of the gases (at standard temperature and pressure) should be required theoretically to char one ton of raw coal. In practice, the amount of gas required will vary up or down according to whether the temperature of the gases leaving No. 1 retort is above or below 750° C., and according to whether the material is carbonized to a temperature of 650° C. or to 750° C.

*Preliminary activation*

After the batch in No. 1 retort has reached a temperature of 650° C. to 750° C., which requires approximately three hours, it is discharged immediately into retort No. 2 where it is subjected to preliminary activation with steam while it is maintained at a temperature of 650°-750° C. The steam is superheated to a temperature of 950° C. to 1000° C. either by means of a conventional superheater or by a pair of waste-heat stoves in parallel. At this temperature the steam contains sufficient sensible heat to compensate for such endothermic reaction of steam with the carbon as occurs. About 3750 pounds of such steam is sufficient for the preliminary activation of the char from one ton of sub-bituminous coal (the amount being regulated by means of a valve on the inlet of No. 2 retort) and results in an activated char having an activity (iodine absorption) of about 60. Preliminary activation of a batch requires about three hours.

The gases exhausted from the No. 2 retort contain a substantial proportion of water vapor and the constituents of water gas. It may be burned to furnish power or converted into hydrogen and $CO_2$, which constituents may be separated and employed respectively in the final activation and carbonating steps, as described in detail hereinafter.

*Catalyzing*

After preliminary activation as described above a catalyst is added to the char to facilitate subsequent carbonation. In the instant case this is accomplished by distributing through the char a 10% aqueous solution of ferric chloride. The ferric chloride thus added is equivalent to form 1 to 3% Fe on the weight of the char, and it is converted to ferric hydroxide or ferric oxide by the addition of an alkali, such for example as a 10% solution of sodium or potassium hydroxide. Ordinarily there will be sufficient residual heat in the char to dry out all of the water added during the catalyzing step. If not, the mixture should be thoroughly dried, either by supplying heat to the catalyzing pot or otherwise, so that the char will contain substantially no water vapor when it is sent to the carbonizing treatment.

Ammonium hydroxide may also be employed to bring about the precipitation of the iron compound within the charge. In such case, means should be provided for heating the catalyzing pot to at least 350° C., so as to decompose the ammonium chloride formed. The ammonia and chlorine thus derived may be recovered separately by conventional means (not shown) and re-introduced into the system, respectively, as ammonium hydroxide and ferric chloride.

An effort should be made to assure a thorough distribution of catalyst throughout the char and to furnish a maximum exposed surface of catalyst. Instead of iron or compounds thereof a variety of catalysts of the hydrating-hydrogenating type may be employed. Thus iron and iron oxides appear to be most effective in promoting the break-up of CO, but metallic or combined cobalt, nickel, manganese, chromium and aluminum, are effective in the order named, and platinum and palladium also promote the decomposition of carbon monoxide to C and $CO_2$.

Various promoters may be employed to enhance the activity of these catalysts. Thus additions of the oxides of chromium, thorium, uranium, beryllium, and antimony to iron, cobalt or nickel catalysts bring about a great increase in their activity. Moreover, the presence of alkali metal oxides promotes the activity of iron catalysts.

*Carbonating*

The dried catalyzed char is introduced in batches into a carbonating retort (No. 3), and its temperature is raised to between 300° C. and 550° C. by the sensible heat of a gas consisting essentially of carbon monoxide, which is forced through the charge (under a pressure of 5 to 20 pounds per square inch above atmospheric) in direct contact therewith from a plurality of upright perforated pipes disposed within the retort.

The carbon monoxide for carbonating is produced in a closed circuit by reaction of carbon dioxide from a supply tank with the carbon of an incandescent coke column which is heated indirectly by conduction through a wall. As the coke is consumed, more is added from time to time from an exterior source. The rate of passage of $CO_2$ into the coke column is damper-regulated so as to assure a maximum content of CO in the output of the column. The CO thus formed is passed through the char batch in the No. 3 retort, where under the influence of the catalyst it dissociates, at least partially, to form $CO_2$ and C. The latter is in large part deposited within and upon the particles of char.

If it is desired to deposit carbon equal to 10% by weight of the char, 12,000 cu. ft. of CO (at standard temperature and pressure) must be decomposed for each ton of char treated.

The gases leaving the No. 3 retort consist essentially of a mixture of CO and $CO_2$ plus some suspended carbon which is removed from the gas stream in a filter, scrubber, settling chamber or other suitable dust collector, and the cleaned mixture is returned (under pressure furnished by a pump) to the coke column.

The use of pure carbon monoxide to carbonate the char is desirable, and in any case the higher the CO content the better. Under the conditions of operation herein contemplated, and with a CO content of the gas supplied to the No. 3 retort of 95–100%, it is necessary to circulate from 6,000 to 70,000 cu. ft. of gas to bring about the deposition of 100 pounds of carbon in the char. The volume of gas circulated depends, of course, upon the effectiveness of the catalyst, the concentration of CO in the gas, the pressure of the gas, and the time and temperature of contact of the gas with the activated char.

The initial carbon dioxide supply to the circuit may be obtained in various ways. The use of a generator charged with limerock and an aqueous solution of 10% hydrochloric, sulphuric or other strong acid is recommended. Once a supply of $CO_2$ is obtained, and except for minor circulation losses the circuit is self-sustaining, and all that is consumed is carbon in the coke column. In other words, once the circulating system is established it is necessary to replace as coke only the carbon deposited, so that the treatment may be continued indefinitely at little cost.

Deposition of carbon during carbonating may be accelerated by supplying acetylene ($C_2H_2$) to the circuit. This gas tends to combine at red heat (for example in the carbonating retort) with carbon monoxide according to the reaction

$$C_2H_2 + CO = 3C + H_2O$$

*Final activation*

After the char has been carbonated, so as to increase its carbon content by a suitable proportion (say 10 to 20%), the batch is discharged from the No. 3 retort and is subjected to final activation in retort No. 4 by being brought into contact with superheated steam mixed with hydrogen in order to inhibit consumption of the carbon by the steam. Treatment for one hour at a temperature of 550° C. to 760° C. with a mixture of two volumes of steam to one of hydrogen is satisfactory. As shown in the figure, the steam is passed through a superheater and mixed with hydrogen from a supply chamber fed by a hydrogen generator. The ratio of steam to hydrogen is regulated by means of valves on the outlet sides of the hydrogen supply and the superheater.

The exhaust gas from the No. 4 retort is a mixture of hydrogen with steam and the products of reaction. It is passed to a scrubber in which it is cooled so that the steam condenses and is removed. After scrubbing the hydrogen in the exhaust gas is returned to the hydrogen supply tank and thus recirculated through the No. 4 retort for final activation. Movement of the hydrogen from the exhaust gases is furthered by a pump disposed between the scrubber and the hydrogen supply chamber.

In the system just described, only reaction and circulation losses of hydrogen, which are very small, need to be replaced, so that once an adequate supply of hydrogen has been placed in circulation, the amount of hydrogen to be supplied by the generator (say by reaction of zinc and an aqueous solution of 10% sulphuric acid, or by electrolysis of an aqueous solution in a Castner type cell) is small.

After final activation, the activated carbon is discharged from the No. 4 retort into an air tight chamber where, after cooling to room temperature it is ready for bagging. It has an activity (iodine absorption) of 70 or more.

If desired, carbon monoxide for the carbonating treatment and hydrogen for the final activation may be obtained from water gas formed in the No. 2 retort during preliminary activation. Equipment for this purpose is indicated in dotted lines on the drawing. Thus gases exhausted from retort No. 2, with or without additional steam are passed through a column packed with iron to bring about reaction of steam and CO to form hydrogen and $CO_2$. The gas is then compressed and forced under high pressure into a water scrubber, where the water absorbs the carbon dioxide, hydrogen remaining undissolved and passing through the scrubber from whence it is introduced to the hydrogen supply chamber, as shown. The water is removed from the scrubber under pressure. Thereafter the pressure is released and the $CO_2$ thus evolved is sent to the carbon dioxide supply tank in circuit with the carbonating, or No. 3, retort. The water from which the $CO_2$ is released is returned to the scrubber.

An alternative method of separating carbon monoxide and hydrogen from the exhaust gas produced in preliminary activation in retort No. 2 involves sending the mixture of water gas and steam from this retort into a reaction chamber kept at a temperature range between 300° and 350° C. and containing a copper-cobalt catalyst. The carbon monoxide in the gas is substantially converted to carbon dioxide under the influence of the catalyst, so that under properly controlled conditions the gas leaving the reaction chamber will contain less than ½ of 1% carbon monoxide. The carbon dioxide thus formed in the reaction chamber may be removed by scrubbing the gas with a 10% tetramine solution consisting essentially of a mixture of diethylenetriamine and triethylenetetramine. The amine solution is removed from the scrubber and subjected to boiling and fractionating treatment. $CO_2$ evolved during this heating may be sent to the carbon dioxide supply tank as described hereinbefore, the regenerated tetramine solution being returned and used to scrub additional gas from the reaction chamber.

For some purposes, carbon produced by the preliminary activation may be suitable, and in that case a portion of the product may be withdrawn after such treatment and marketed.

It should be noted that the preliminary activation prior to carbonation treatment is particularly desirable in that it tends to increase greatly the porosity of the char and hence creates a favorable condition for the deposition of carbon formed by dissociation of carbon monoxide, and my invention contemplates such preliminary activation followed by treating the preliminarily activated char with a current of gas containing a substantial content of carbon monoxide under such conditions that the carbon monoxide dissociates to form carbon dioxide and carbon, at least a portion of the carbon thus formed being retained in the char.

The catalyst for promoting the dissociation of the carbon monoxide may be added following preliminary activation as described hereinbefore but in many instances it is desirable to add the catalyst prior to preliminary activation, for example, to the raw material which is to be charred. The addition of the catalyst such, for example, as an iron compound at an early stage in the operation facilitates its dispersion during handling and hence increases its catalytic activity. Moreover, catalysts of the hydrating-hydrogenating type exert a beneficial influence in preliminary activation as well as in the subsequent carbonating steps, and for this reason it may be desirable to add the catalyst to the material at as early a stage as is possible.

I claim:

1. In a process of active carbon production involving the formation of a char by destructive distillation of a carbonaceous material, the improvement which comprises dissociating carbon monoxide in contact with the char to form additional carbon, depositing the additional carbon in the char, and thereafter activating the char by introducing into the char a mixture of superheated steam and hydrogen, the proportion of hydrogen present in the mixture being substantial and such that reaction between the additional carbon and the steam is inhibited.

2. In a process of active carbon production involving the formation of a char by destructive distillation of carbonaceous material and the activation of the char by contact with a hot gas to expel adsorbed substances therefrom, the improvement which comprises conducting the destructive distillation by passing a hot gas through a body of the carbonaceous material, subjecting the resultant char to preliminary activation by passing superheated steam through a mass of the char thereby forming water gas, thereafter dissociating hot carbon monoxide in contact with the char to form elemental carbon, depositing the elemental carbon in the char, activating the char containing said elemental carbon by passing through a mass thereof a mixture of superheated steam with a substantial proportion of hydrogen, whereby the consumption of said carbon by the superheated steam is inhibited, reacting the water gas with water vapor in the presence of iron to form hydrogen and carbon dioxide, separating the hydrogen from the carbon dioxide thus formed and mixing said hydrogen with the superheated steam employed to activate the char containing the elemental carbon.

3. In a process of active carbon production involving the formation of a char by destructive distillation of carbonaceous material and the activation of the char by contact with a hot gas to expel adsorbed substances therefrom, the improvement which comprises conducting the destructive distillation by passing a hot gas through a mass of the carbonaceous material, subjecting the resultant char to preliminary activation by passing superheated steam through a mass thereof with resultant formation of water gas, thereafter dissociating hot carbon monoxide in contact with the char to form elemental carbon, depositing the elemental carbon in the char, activating the char containing said elemental carbon by passing through a mass thereof a mixture of superheated steam with a substantial proportion of hydrogen, whereby the consumption of said carbon by the superheated steam is inhibited, reacting the water gas with steam in the presence of iron to form hydrogen and carbon dioxide, separating the hydrogen from the carbon dioxide thus formed, passing said separated carbon dioxide in contact with incandescent carbon to form carbon monoxide and passing said carbon monoxide to the step wherein carbon monoxide is dissociated in contact with the char to form elemental carbon.

4. Process according to claim 3 in which the hydrogen derived from the water gas is admixed with the superheated steam employed to activate the char containing the deposited elemental carbon.

5. Process according to claim 3 in which carbon dioxide is separated from the hydrogen obtained from the water gas by scrubbing with water under elevated pressure, and the carbon dioxide thus dissolved by the water is being expelled therefrom by reducing the pressure upon the water out of contact with the hydrogen and subsequently reacted with carbon to form carbon monoxide which in turn is dissociated to deposit activated carbon in the char.

6. In a process of active carbon production involving the formation of a char by destructive distillation of a carbonaceous material and the activation of the char by contact with superheated steam, the improvement which comprises passing carbon monoxide in contact with the char and dissociating carbon monoxide in contact therewith to form elemental carbon, depositing the elemental carbon in the char and subsequently subjecting the char containing the deposited elemental carbon to the action of a mixture of about two volumes of steam to one of hydrogen for one hour at a temperature ranging from 550° C. to 750° C.

7. In a process of active carbon production involving the formation of a char by destructive distillation of sub-bituminous coal, the improvement which comprises conducting the destructive distillation by passing through a body of the sub-bituminous coal a hot gas containing substantial proportions of water vapor while heating said body to a temperature of 650° C. to 750° C. until volatile products in the coal have been substantially removed, precipitating a catalyst selected from the group consisting of iron oxides and iron hydroxides in contact with the resulting char, passing carbon monoxide through the resulting catalyzed char while maintaining said catalyzed char at a temperature ranging between 300° C. and 550° C. until a substantial proportion of elemental carbon has been deposited in the char, and thereafter subjecting the char at a temperature of 550° C. to 750° C. to activation by contact with a mixture containing about two volumes of superheated steam to one volume of hydrogen.

8. Process according to claim 7 in which the destructive distillation of the sub-bituminous coal by contact with the hot gas containing water vapor is conducted in approximately three hours.

9. Process in accordance with claim 7 in which from 6,000 to 70,000 cu. ft. of gas (measured at standard temperature and pressure) and containing carbon monoxide is passed in contact with the char for each 100 lbs. of carbon deposited in the char.

KENNETH BARTON STUART.

CERTIFICATE OF CORRECTION.

Patent No. 2,358,359.                                      September 19, 1944.

KENNETH BARTON STUART.

It is hereby certified that error appears in the printed specification of the above numbered patent requiring correction as follows: Page 3, second column, line 13, for "wtih" read --with--; page 4, first column, line 61, for "form" read --from--; page 6, second column, line 10, claim 5, after "water" strike out "is"; line 48, claim 7, for "750° C." read --760° C.--; and that the said Letters Patent should be read with this correction, therein that the same may conform to the record of the case in the Patent Office.

Signed and sealed this 15th day of May, A. D. 1945.

Leslie Frazer (Seal)                                   Acting Commissioner of Patents.